US012502994B2

(12) United States Patent
Reister

(10) Patent No.: US 12,502,994 B2
(45) Date of Patent: Dec. 23, 2025

(54) METHODS AND SYSTEMS FOR MANAGING DEMAND FOR ELECTRIC VEHICLE CHARGING IN A TENANT ENVIRONMENT AND RELATED APPLICATIONS AND DEVICES

(71) Applicant: GoPowerEV Inc., Palo Alto, CA (US)

(72) Inventor: John Reister, Palo Alto, CA (US)

(73) Assignee: GoPowerEV Inc., Palo Alto, CA (US)

( * ) Notice: Subject to any disclaimer, the term of this patent is extended or adjusted under 35 U.S.C. 154(b) by 1105 days.

(21) Appl. No.: 16/987,083

(22) Filed: Aug. 6, 2020

(65) Prior Publication Data
US 2021/0039514 A1 Feb. 11, 2021

Related U.S. Application Data

(60) Provisional application No. 62/883,580, filed on Aug. 6, 2019.

(51) Int. Cl.
*B60L 53/62* (2019.01)
*B60L 53/53* (2019.01)
(Continued)

(52) U.S. Cl.
CPC .............. *B60L 53/62* (2019.02); *B60L 53/53* (2019.02); *B60L 53/64* (2019.02); *B60L 53/665* (2019.02);
(Continued)

(58) Field of Classification Search
CPC ........ B60L 53/62; B60L 53/64; B60L 53/665; B60L 53/66; G06Q 10/06312;
(Continued)

(56) References Cited

U.S. PATENT DOCUMENTS 9,362,761 B2 6/2016 Appelbaum et al.
10,065,519 B1 9/2018 Appelbaum
(Continued)

FOREIGN PATENT DOCUMENTS

JP 2010284039 A * 12/2010 .......... B60L 11/1818

OTHER PUBLICATIONS

Xie et. al., "Modeling and Simulation of Public EV Charging Station with Power Storage System", 2011 International Conference on Electric Information and Control Engineering (Year: 2011).*
(Continued)

*Primary Examiner* — Helal A Algahaim
*Assistant Examiner* — Shien Ming Chou
(74) *Attorney, Agent, or Firm* — Stanek Lemon Crouse & Meeks, PA

(57) ABSTRACT

A method of operating an electric vehicle charging system can be provided by receiving a request to initiate a charging session for an electric vehicle associated with a registered user of a tenant electric vehicle charging system, allocating a receptacle of a outlet to the charging session to provide an allocated smart outlet, initiating supply of electrical power to the electric vehicle associated with the registered user via the allocated smart outlet responsive to the request to begin the charging session, monitoring the supply of electrical power to the electric vehicle to determine a cost associated with the charging session, receiving a request to terminate the charging session for the electric vehicle; determining a total cost for the charging session; and requesting payment of the total cost for the charging session.

19 Claims, 13 Drawing Sheets

(51) Int. Cl.
*B60L 53/64* (2019.01)
*B60L 53/66* (2019.01)
*G05B 19/042* (2006.01)
*G06Q 10/0631* (2023.01)
*G06Q 20/14* (2012.01)
*G06Q 50/06* (2024.01)
*H02J 7/00* (2006.01)

(52) U.S. Cl.
CPC ..... *G05B 19/042* (2013.01); *G06Q 10/06312* (2013.01); *G06Q 10/06315* (2013.01); *G06Q 20/145* (2013.01); *G06Q 50/06* (2013.01); *H02J 7/00032* (2020.01); *H02J 7/0047* (2013.01); *G05B 2219/2639* (2013.01)

(58) Field of Classification Search
CPC ............ G06Q 10/06315; G06Q 20/145; H02J 7/0047; H02J 3/32; H02J 2310/60; H02J 13/00006; H02J 13/0005; G05B 2219/2639; Y02B 90/20; Y02T 90/167; Y02T 10/70; Y02T 10/7072; Y02T 90/12; Y02T 90/16; Y04S 10/126
USPC .......................................................... 701/22
See application file for complete search history.

(56) References Cited

U.S. PATENT DOCUMENTS

| | | | |
|---|---|---|---|
| 2005/0221806 A1* | 10/2005 | Sengupta | H04W 4/02 455/414.3 |
| 2011/0265694 A1* | 11/2011 | Portis | H01M 10/465 320/101 |
| 2015/0266389 A1* | 9/2015 | Appelbaum | B60L 58/12 320/138 |
| 2016/0144728 A1* | 5/2016 | Harper | B60L 53/67 320/109 |

OTHER PUBLICATIONS

Electric Vehicle Charging Guide, "2019 Guide on How to Charge your Electric Car with Charging Stations". (Year: 2019).*
Sengnongban et. al., (hereinafter Sengnongban), "Control Strategy of PEVs Charging for Reducing the Impact of Power Fluctuation in Micro Grid", Proceeding of the International Electrical Engineering Congress 2014 (Year: 2014).*
Marketing, "Four Factors Driving Load Control Program", Aclara Technologies Blog, hubbell.com (Year: 2018).*
Chynoweth et al., "Smart Electric Vehicle Charging Infrastructure Overview", 2014 IEEE PES Innovative Smart Grid Technologies (ISGT) Conference Feb. 19-22. Washington, DC, USA (Year: 2014).*

* cited by examiner

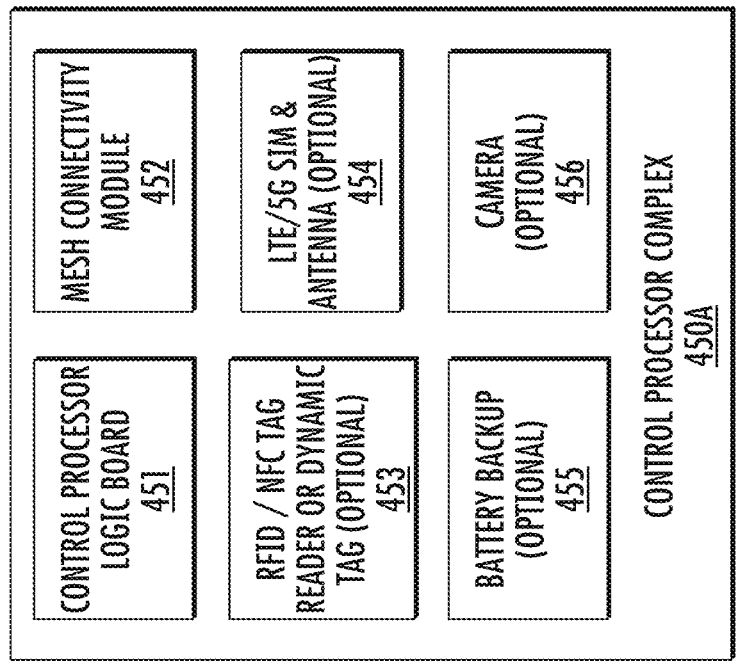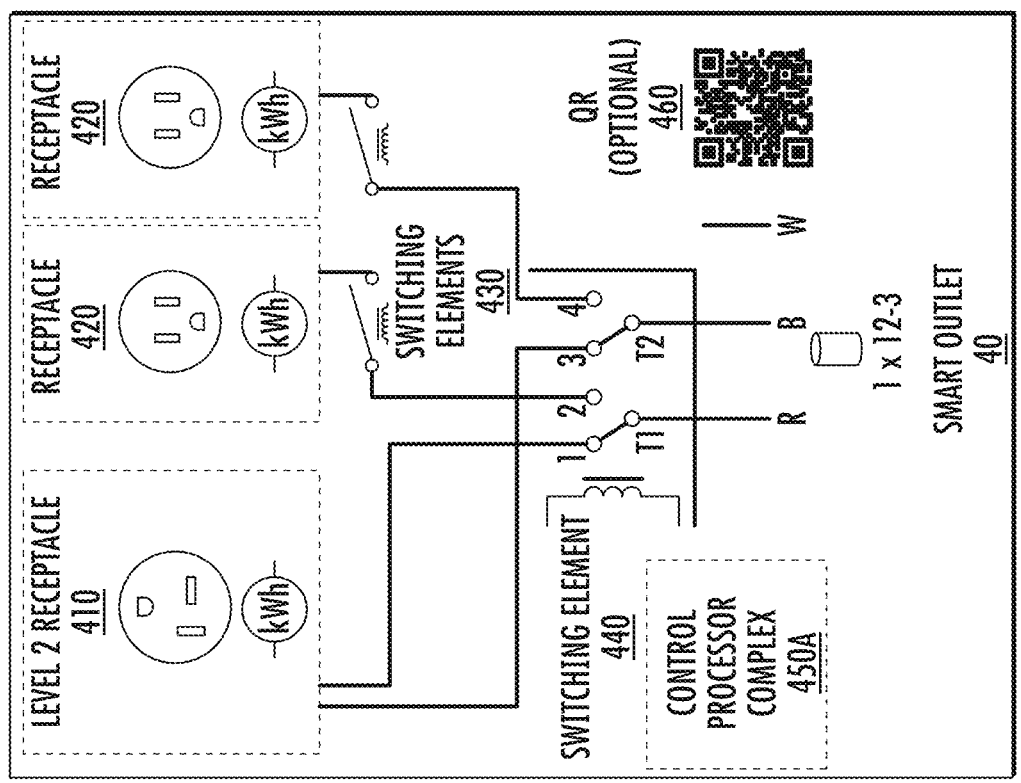
FIG. 2

METHODS AND SYSTEMS FOR MANAGING DEMAND FOR ELECTRIC VEHICLE CHARGING IN A TENANT ENVIRONMENT AND RELATED APPLICATIONS AND DEVICES

CROSS-REFERENCE TO RELATED APPLICATIONS AND CLAIM FOR PRIORITY

The present application claims the priority of U.S. Provisional patent Application Ser. No. 62/883,580 titled Systems, Devices, Applications, And Related Methods Including Measuring And Controlling Local Individual Electric Power Receptacles, filed in the U.S.P.T.O. on Aug. 6, 2019, the entire disclosure of which is hereby incorporated herein by reference.

FIELD

Embodiments according to the invention relate generally to the field of power systems, and more particularly, to power demand management systems.

BACKGROUND

Controlling the charging of electric vehicles is known as discussed, for example, in U.S. Pat. Nos. 9,362,761 and 10,065,519.

BRIEF DESCRIPTION OF THE DRAWINGS

The foregoing and other objects, features, and advantages of the present invention will become more apparent from the following detailed description when taken in conjunction with the accompanying drawings. In the drawings, similar reference characters denote similar elements throughout the different views, in which:

FIG. 2 illustrates components of a Smart Outlet box including the sub-systems of a Control Processor Complex in some embodiments according to the invention.

DETAILED DESCRIPTION OF EMBODIMENTS ACCORDING TO THE INVENTION

As appreciated by the present inventor, apartment buildings, hotels, and commercial properties have shared vehicle parking spaces that are accessible by tenants or by the general public, and some apartment buildings have assigned spaces. In most cases, these parking spaces may have no electric power outlets nearby, which can make it difficult to charge an Electric Vehicle (EV). When outlets are present, there are often several challenges associated with plugging in EV supply equipment (EVSE): (a) The outlets are fed by common building power and there is no means to measure the electricity consumed to assess a fee to the end-user or tenant. (b) The outlets are on a shared power source and plugging in multiple EVSE will overload circuits and trip circuit breakers. (c). The only outlet types available only support EVSE Level 1 charging, which only provides enough power for approximately 4 miles of vehicle range for each hour of charging.

As further appreciated by the present inventor, installing new Level2 EVSE may be prohibitively expensive, as they typically require 40 to 50 Ampere dedicated circuits for each unit. Local electric codes often prohibit the substantial oversubscription of these circuits, which often means the property's main electric panel must be upgraded. These may further require an upgrade to the electric feeder cable from the utility service provider and may even necessitate an upgrade to the transformers in the utility's distribution plant. Because of these high costs, only a very small portion of the vehicle parking spaces may be upgraded for EVSE. If these spaces are assigned for the use of a particular tenant or end user, then the EVSE may only be utilized a fraction of the available time. Also, once all EVSE-enabled spaces are assigned to existing tenants, the marketing value to the property owner is reduced. If these EVSE spaces are open to all tenants on first-come-first-serve basis, then the tenants or end-users will be asked by others to move their vehicles after charging is complete—a substantial inconvenience.

Figure 1:
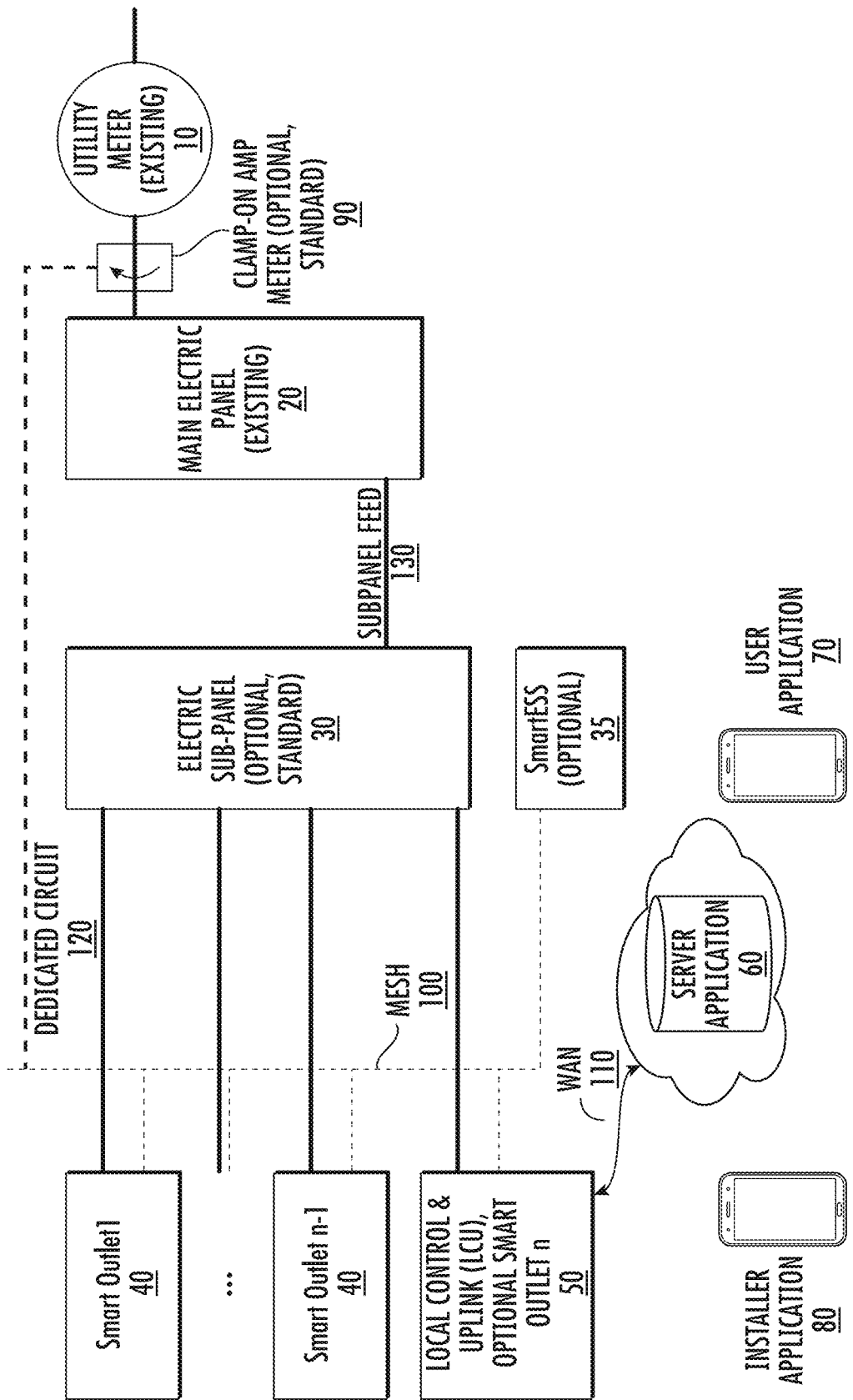
FIG. 1 illustrates a system for managing demand for electric vehicle charging in a tenant environment using processes and devices configured to measure and switch power in some embodiments according to the invention.
Figure 3:
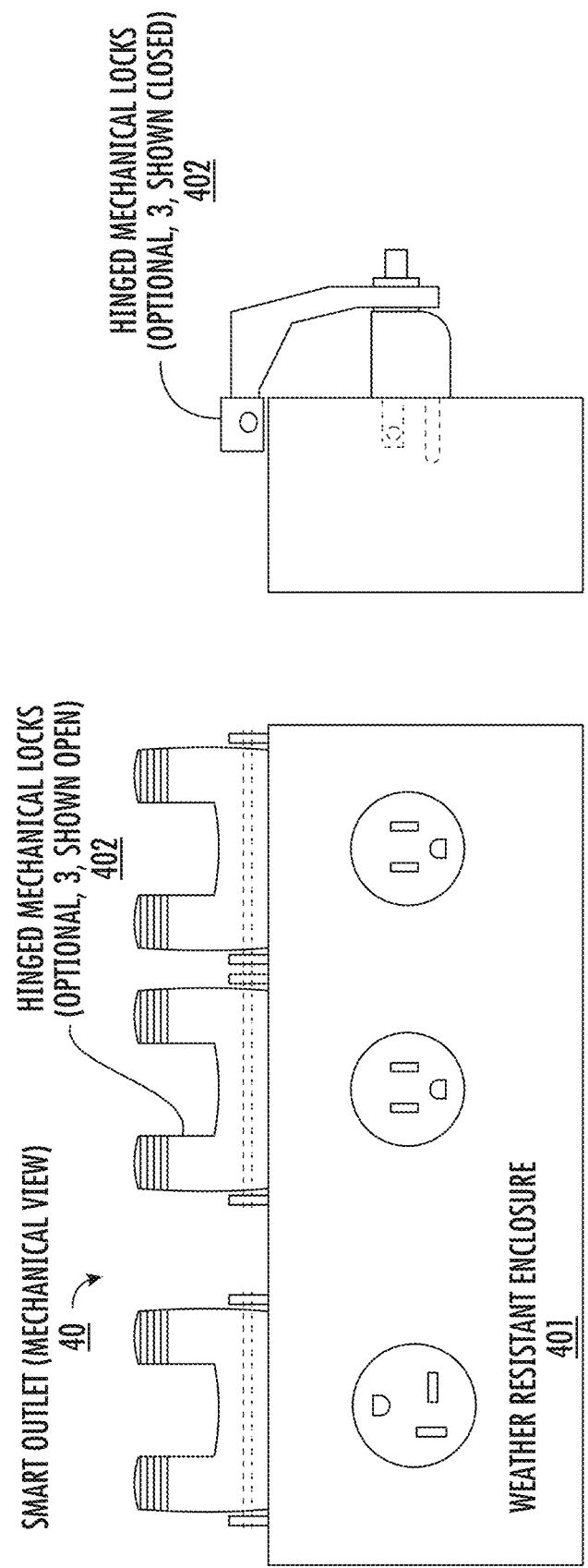
FIG. 3 illustrates a mechanical view of a Smart Outlet box including a locking mechanism in some embodiments according to the invention.
Figure 4:
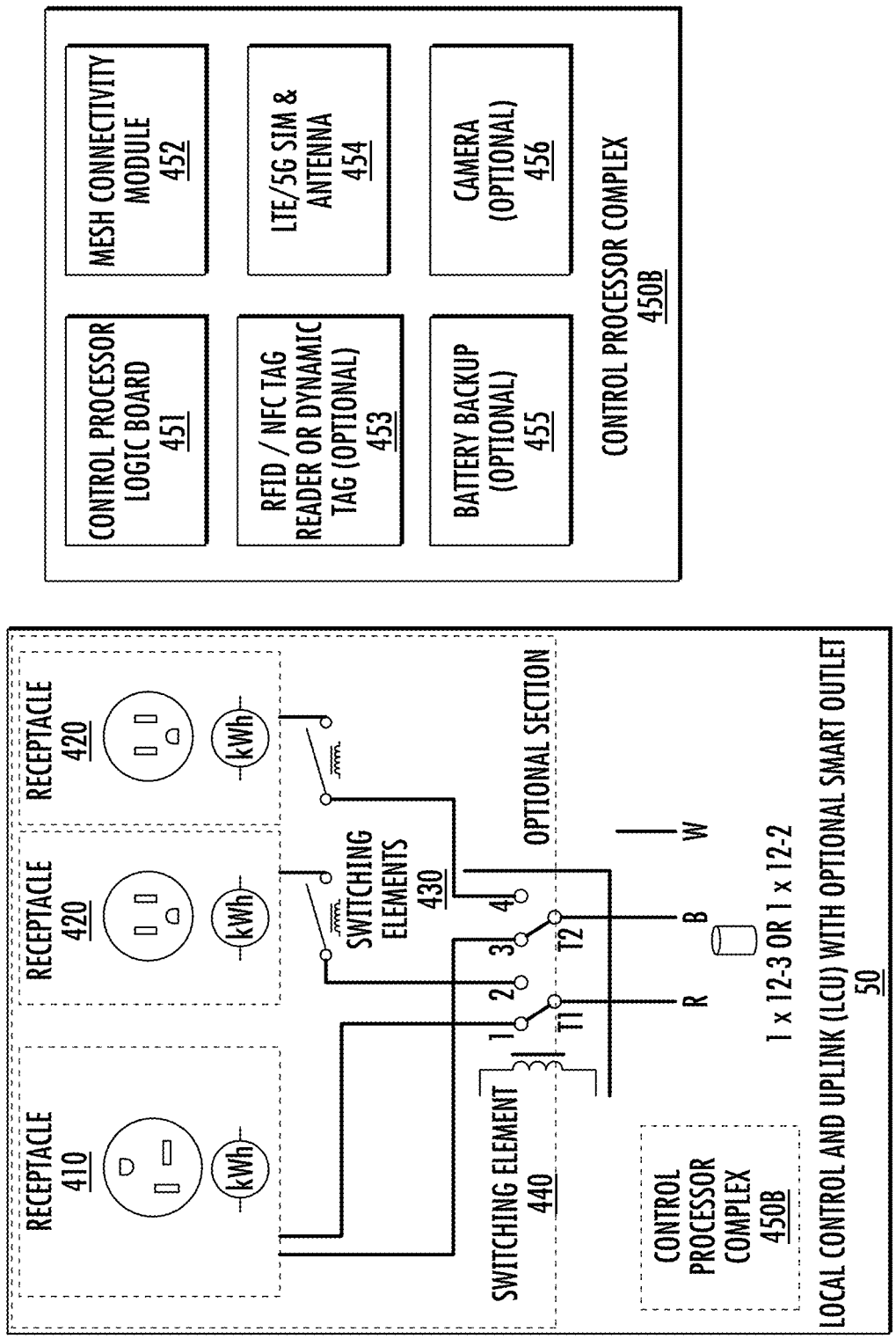
FIG. 4 illustrates a Local Control and Uplink including the components of its Control Processor Complex in some embodiments according to the invention.
Figure 5:
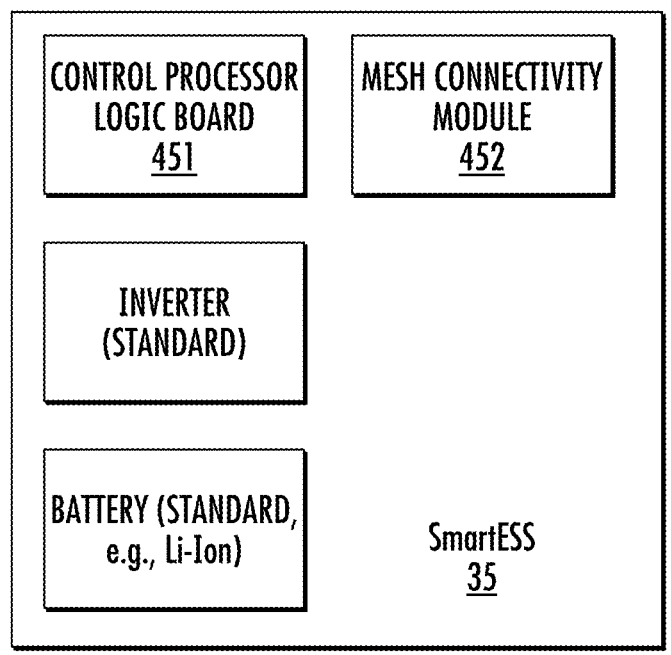
FIG. 5 illustrates the Smart ESS in some embodiments according to the invention.
Figure 6:
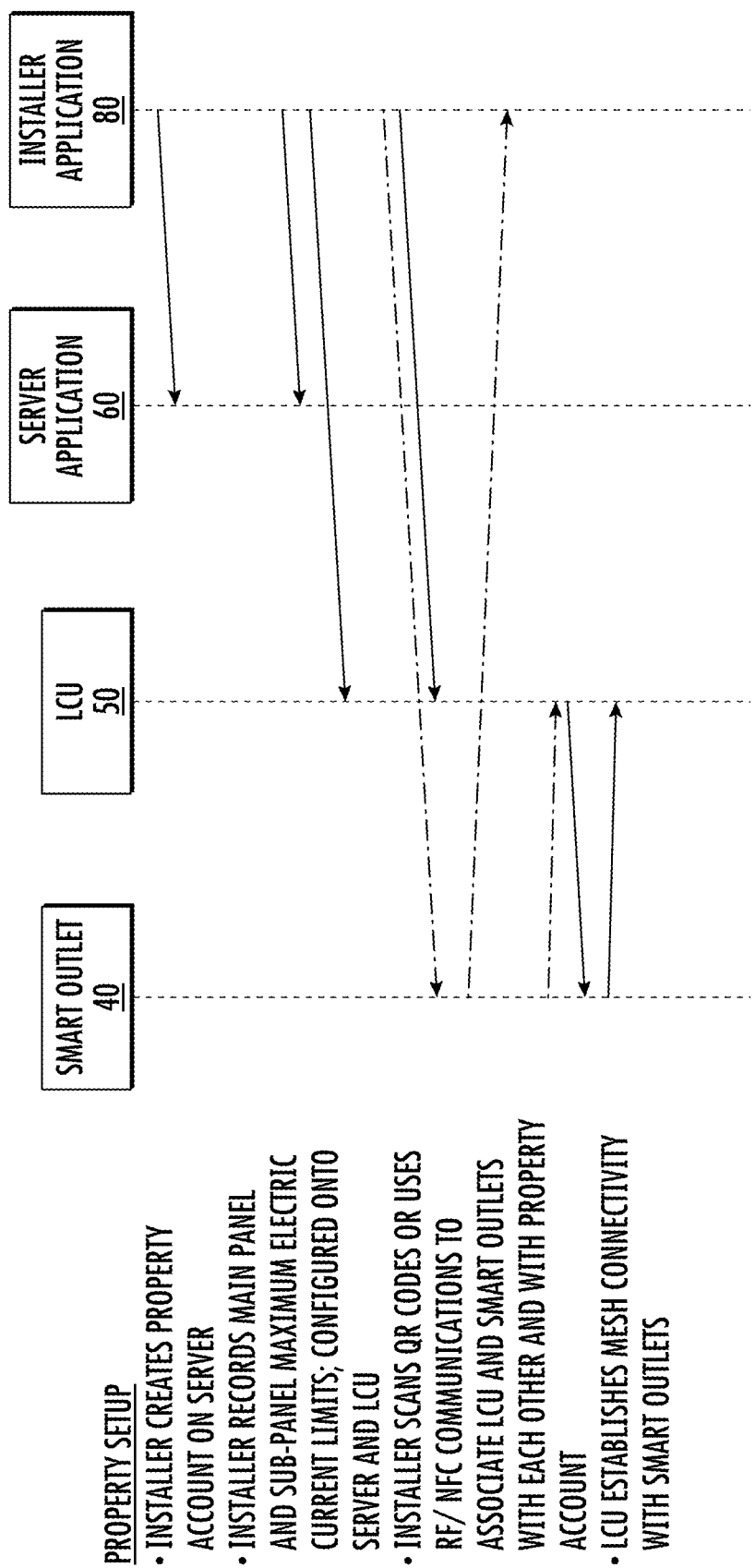
FIG. 6 illustrates operations of a property setup process by an Installer in some embodiments according to the invention.
Figure 7:
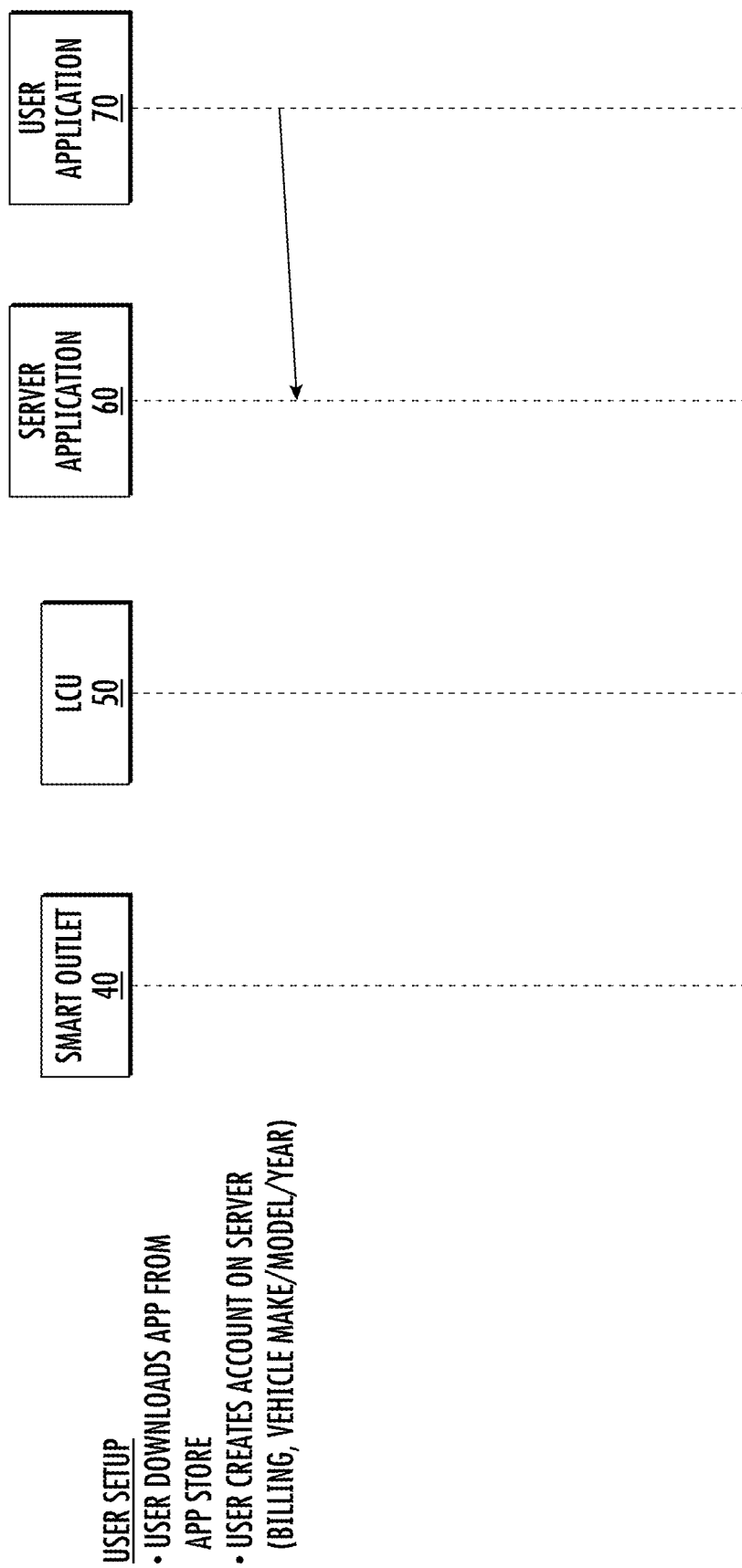
FIG. 7 illustrates a user account setup process in some embodiments according to the invention.
Figure 8:
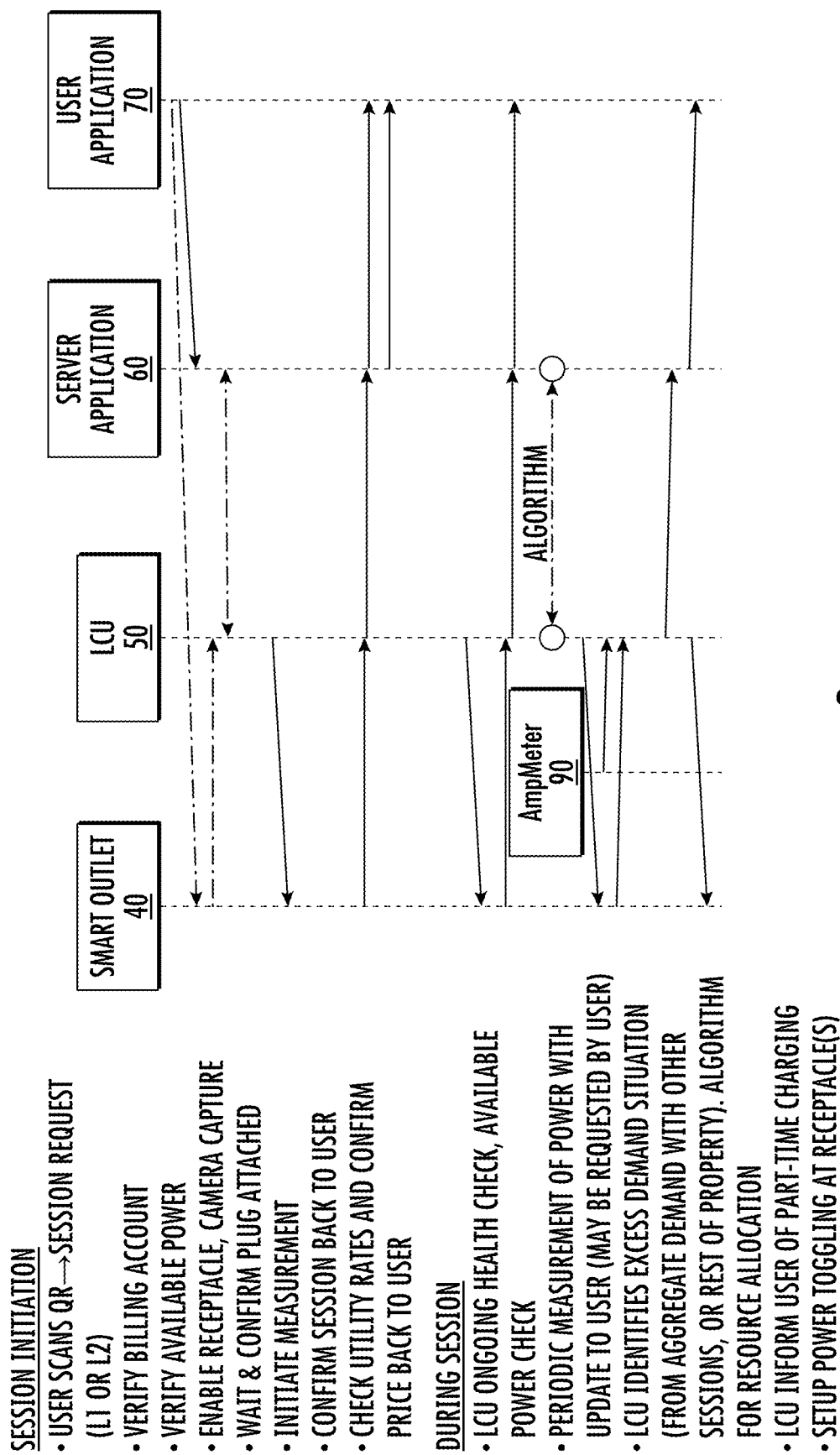
FIG. 8 illustrates a session initiation process and an ongoing session monitoring/updating process in some embodiments according to the invention.
Figure 9:
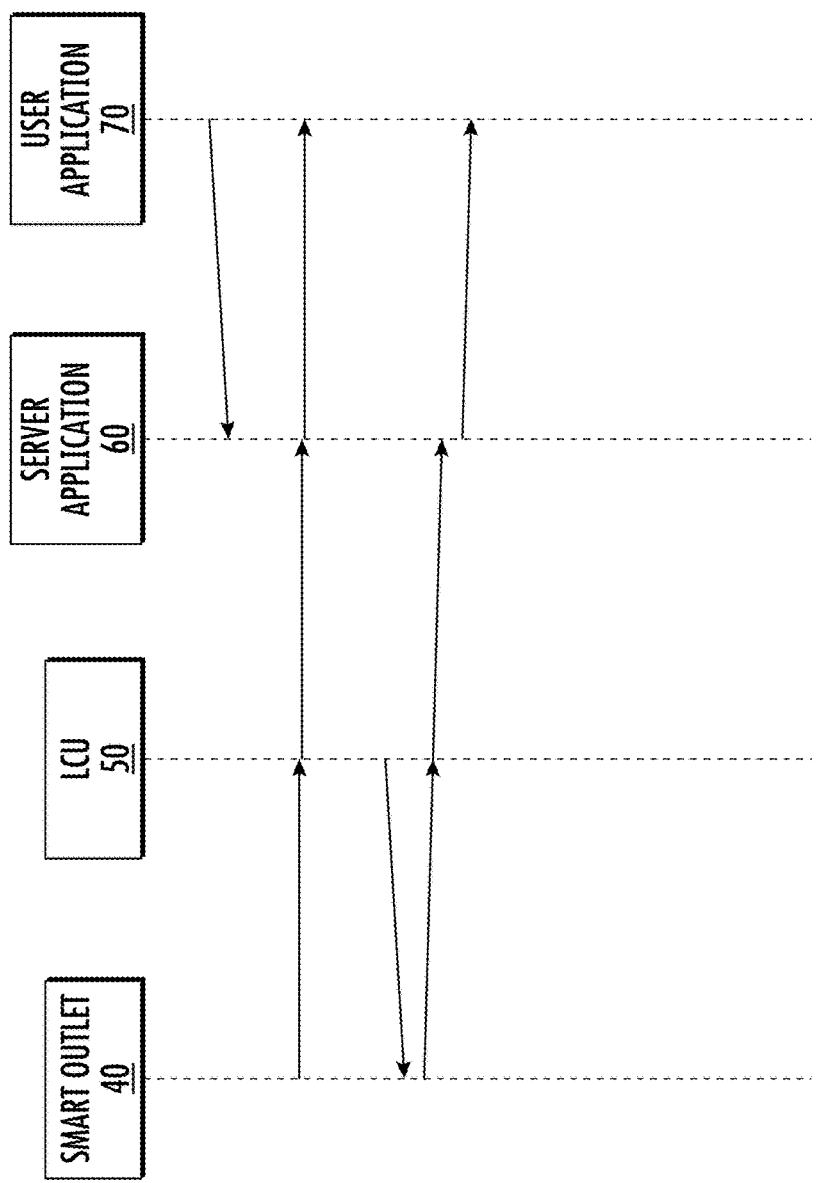
FIG. 9 illustrates a session termination process in some embodiments according to the invention.

As further appreciated by the present inventor, each property may already have a meter 10 and a main electrical panel 20 as shown in FIG. 1 as "existing". The electric utility controls/owns the meter and the feed to the meter. The property owner/manager controls/owns the main electrical panel.

An electrical subpanel 30 may be optionally installed by an electrical contractor in some embodiments according to the invention. The subpanel is standard and currently commercially available. The electrical contractor may choose to install a subpanel if there is insufficient busbar space inside the main panel.

In some embodiments according to the invention, one or more Smart Outlet boxes 40 are installed, each of which may have multiple receptacles capable of supporting Level 1 or Level 2 charging. Each Smart Outlet Box is connected to the subpanel, or to the main panel if no subpanel is installed, via a dedicated circuit 120. In some embodiments according to the invention, the Smart Outlets can determine if a plug is inserted into each receptacle. The Smart Outlets can enable/disable the individual receptacles and can measure the electric current and power being supplied to each receptacle. In some embodiments the Smart Outlets can be connected to the LCU. In some embodiments the Smart Outlets can be connected to the LCU 50 and to one another via a secure mesh 100, and can communicate the present and historical state of each receptacle, and can receive instructions pertaining to enabling/disabling each receptacle.

In some embodiments according to the invention, the Smart Outlets is configured controllably switch power to the electrical vehicles under control of the LCU. In some embodiments, the Smart Outlets can have sensors which can assess the state of the receptacles (within the Smart Outlet) as well as the adjacent physical environment including but not limited to some or all of the following: whether the receptacle has a plug connected, whether power is flowing, how much electrical current and voltage, temperature, motion nearby, shock and vibration, camera, microphone, near-field/RF communication; and has indicators including but not limited to some or all of the following: LCD screen, LEDs, speaker.

An optional Smart Electrical Storage System (Smart ESS) 35 is connected to the subpanel and participates in the secure mesh 100. The Smart ESS 35 provides extra power when there is need from the Smart Outlets and is charged when there is lower demand from the Smart Outlets.

An optional Clamp-on Amp meter 90 participates in secure mesh 100 and is attached to the cable between the Meter 10 and the Main Panel 20 to inductively measure in real-time the aggregate current demand by the property.

A Local Control & Uplink (LCU) with Optional Smart Outlet 50 participates in the secure mesh 100. It coordinates the Smart Outlets and optional SmartESS on the property to ensure that power (kWh) and current (Amp) demand do not exceed what the utility can provide and what the main panel and subpanel can support. The LCU can locally communicate with the Installer Application 80 without going through the uplink. The LCU includes a secure wide-area network (WAN) uplink with battery backup. The uplink supports reporting both real-time and historical information from each receptacle, from the Smart ESS, and from the Clamp-on Amp meter. The uplink also can receive control information from the cloud-based Server Application 60.

A cloud-based Server Application 60 is virtualized software that communicates to each property's LCU 50 via the secure WAN uplink 110. It includes a database of properties (and associated devices), tenants' billing information, utility information (rates, billing), and charging session information/status. The Server Application communicates with Installer Applications 80, user Applications 70, and optionally utility systems to gather real-time electricity rates and grid status. The Server Application provides a dashboard and operator console to assess the status of individual or multiple properties and to establish, modify, or maintain billing account information.

A Client Application 70 is a downloadable smartphone application that allows tenants and end-users to establish an account, to initiate and terminate charging sessions, and to check the status of sessions.

An Installer Application 80 is a downloadable smartphone application that allows the system installer (typically a licensed electrical contractor) to setup the property, and associate the Smart Outlet boxes, the Smart ESS, and the Clamp-on Amp Meter with the LCU. It provides configuration of the WAN uplink in the LCU, and configuration of property-specific information such as physical site address, and main panel/sub-panel physical size, circuit information, layout, brand, and size of utility feed/main breaker.

An optional standard Clamp-on Amp Meter 90 is connected to secure mesh 100 and allows the LCU to query the real-time power & current demand for the whole property.

A standard secure Mesh 100 provides intra-property connectivity amongst the various components. The "physical layer" connectivity may include standard Bluetooth, WiFi, RFID, or Powerline. The communications may be secured via standard Internet Protocol tunneling with standard encryption using a challenge-response handshake.

A standard WAN uplink 110 provides secure communication with the cloud server application. The "physical layer" connectivity includes an antenna which may leverage WiFi, or mobile 3G, 4G, and/or 5G. The communications are secured via standard Internet Protocol tunneling with standard encryption using a challenge-response handshake.

A standard dedicated circuit 120 connects each Smart Outlet box to either the optional Subpanel or directly to the Main Panel, if space is available. The dedicated circuit can include electrical conductors inside of electrical conduit. The size (gauge) of the wire and conduit may vary according to local building code and the type of receptacles inside each Smart Outlet box.

A standard subpanel feed 130 connects the optional sub-panel to the main panel. The size (gauge) of the wire and conduit will vary based on the size of the associated circuit breaker in the main panel, and according to local building code. The size of the associated circuit breaker is one of the key constraints for the LCU to control the maximum concurrent electrical demand from the aggregate of the Smart Outlet Receptacles on the property.

FIG. 2 shows the Smart Outlet components. The Smart Outlet box includes a Level2 Receptacle 410 and two Level1 Receptacles 420. Each receptacle has a meter that measures the current in Amps and the energy in kWh or Joules. The Smart Outlet has one double switching element 440 and two single switching elements 430. Based on this configuration, the double switching element allows current to flow to either the Level2 Receptacle or the pair of Level 1 Receptacles. The single switching elements control each Level 1 Receptacle. Therefore, the possible states are: (a) All off; (b) L2 On and both L1 Off; (c) L2 off and either L1 On; (d) L2 off and both L1 On.

In some embodiments of the invention, a QR code 460 is printed on the cover of the outlet box. This simplifies the process of installing the system, and also simplifies the establishment of a charging session.

The Control Processor Complex 450A includes a number of mandatory and optional subcomponents. There is an ARM-based logic and memory board 451 that runs the software.

The Mesh Connectivity Module 452 provides standard connectivity to the other Smart Outlets and to the LCU. The Mesh uses multiple standard technologies including Bluetooth, WiFi, and Powerline. By using a mesh, not every Smart Outlet needs to directly connect to the LCU. Information moving across the mesh is encrypted.

An optional RFID tag reader or NFC dynamic tag provides an alternative means of enabling outlets to start a session. The user may use their NFC-enabled Smartphone to communicate with the Smart Outlet, or a unique RFID tag is mailed to the user when they register their account if the user requests it.

Smart Outlets may optionally connect to the Internet via mobile access using an antenna and SIM for 3G/LTE/5G access. Typically, only the LCU will use mobile access as there is a monthly cost associated with this access. If this module is present, then a battery backup 455 may also be provided which allows the Smart Outlet to communicate status to the LCU and the Server Application.

An optional camera 456 can be activated whenever a session is started or terminated, or a plug is inserted or removed from one of the receptacles. The camera images can be stored locally, at the LCU, or uploaded to the Server Application.

The Smart Outlet box 40 can provide either 2×Level 1 or Level 2 charging. A double switching element ensures that it is impossible for both to be active at the same time, which allows a lower-cost dedicated circuit to be used to supply the box. The use of receptacles means that tenants or end-users can utilize their own standard, commercially available, plug-in EVSE equipment.

Each of the Receptacles 420, 430 may detect the physical presence of a plug and can be individually enabled or disabled. This allows: (a) the system at the property locally to ensure that aggregate electrical demand doesn't trip the circuit breaker nor exceed available power to the property by intermittently turning off selected receptacles; (b) tenants or end-users who initiate a session can get power and those who have not initiated a session cannot get power; (c) if there is no plug, then no power will be consumed and the property power management process can allow other tenants/end-users to get more charging time; (d) the tenant/end-user can be alerted if their EVSE is prematurely unplugged, which may indicate an in-progress theft of their EVSE; (e) the Server Application 60 can force a power demand reduction at the property based on utility electrical grid requirements.

Each of the Receptacles 420, 430 can assess the real-time consumption of electrical current and energy. This allows: (a) tenants or end-users to be billed for the electrical energy that they consume in their sessions; (b) the information can be used by property demand queuing control process to use the relays to selectively and intermittently disable receptacles to control aggregate electrical demand; (c) the information can be used locally to trigger the use of energy stored in the SmartESS 35 or alternatively to cause the SmartESS to use power to store more energy; (d) the information can be used by Server Application 60 in conjunction with utility real-time prices to choose which end-users or tenants get more charging time based on willingness to pay, or to decide to trigger modes of SmartESS; (e) the information can be provided to the local electric utility for use in managing the electric grid A variant of the Smart Outlet box 40 provides an RF Key reader or NFC mechanism, in case the tenant/end-user's Smartphone has no Internet nor mobile network access at the Smart Outlet box location. This is a common situation in underground parking garages.

The mesh between the LCU 50 and the other devices means that some or all of the Smart Outlet boxes may be in locations where there is no Internet nor mobile network access, and the LCU provides the access to the Cloud-based Application Server 60 on their behalf. The use of several alternative physical layer technologies including Powerline in the mesh means that the LCU may be situated in a secure and separate location on the property that has either or both of good mobile or good WiFi connectivity signal strength.

Battery-backup in the LCU 50 allows the LCU to update the Application Server 60 in the event of power failure or tripping of circuit breakers.

The optional Camera 456 provides security around the Smart Outlet boxes and/or LCU, to reduce incidents of theft of EVSE equipment or vandalism.

It will be understood that, as used herein, the term "user demand weight time vector" includes a schedule of time intervals during which charging will be provided to the user's electric vehicle using associated charging parameters (such as the level of charge) based on factors provided by the user at the start of the charging session, such as an indication of the wiliness of the user to pay premium pricing for charging, a time at which the user desires to depart or stop charging, the level of charge to be provided to the electric vehicle during the charging session, and a travel range to be provided to the electric vehicle by the end of the charging session (sometimes referred to as a charge).

It will be further understood that the user demand weight time vector can change during the charging session in response to changes in the cost time vector, the resource time vector, the other charging sessions running concurrently, priority of other user's charging sessions relative to the user's charging session etc. Still further, it will be understood that each user demand weight vector can be affected by other user's demand weight vector that are initiated after the user's session begins. Still further, the user demand weight time vector can be affected by the predicted charging activity of other users based on, for example, historical analysis of those other users or based on overall system activity. In still other embodiments, the predicted charging activity of other users can be based on the monitored activity of registered users, such as a monitored geographic location of those users, current status of those users' electric vehicle, the public schedule of those other users and the like.

The term "charge level time vector" includes the level of charge that will be provided to the user's electric vehicle during the session which includes the desired departure time.

Figure 10:
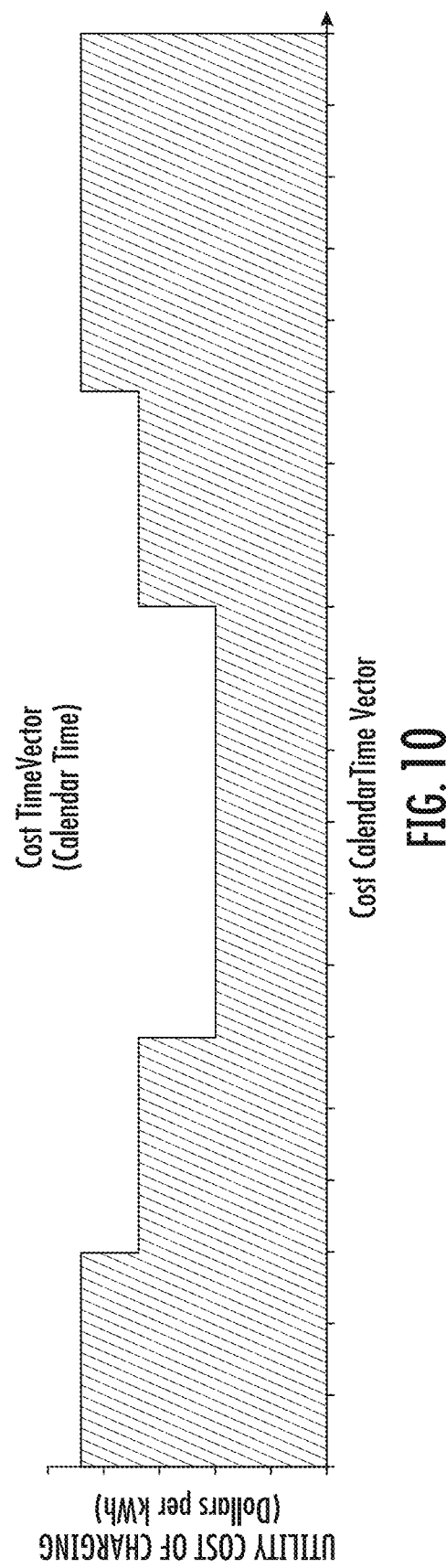
FIG. 10 is a schematic representation of a cost time vector representing the cost of electrical power provided by a utility to the property as a function of time in some embodiments according to the invention.

FIG. 10 is a schematic representation of a cost time vector 1000 representing the cost of electrical power provided by a utility to the property as a function of time in some embodiments according to the invention. According to FIG. 10, the cost time vector 1000 reflects that cost varies as a function of time based on the cost of power provided to the property by an electrical utility. It will be understood that power provided to the property can be priced in any time unit, including kW-h. It will also be understood that the cost of power provided to the property as a function of time can be used to determine a user's demand weight time vector due in-part to the user's willingness to accept the cost of the power as a function of the time during their charging session. For example, if at the start of a charging session, a user indicates a willingness to accept premium pricing, then the user's demand weight time vector may be configured to enable charging at some times when the price may be higher than typical, so that the electric vehicle can be charged to meet the user's need to have charging complete at a certain time or complete upon reaching a particular charge level. Accordingly, even though the cost time vector 1000 may be the same for each user of the system, each of the users may have a different respective demand weight time vector based on in-part their willingness to accept premium pricing and the predicted and/or actual charging activity for other users concurrent with their charging session.

Still referring to FIG. 10, it will be understood that each property operating a system according to the invention, may have different cost time vectors. In particular, each property that operates the system shown in FIG. 1 can have its own respective cost time vector. Moreover, the cost time vector for each property can be different. Accordingly, in some embodiments according to the invention, different properties operating otherwise independent systems may elect to open their respective system to registered users of other systems who may charge their electric vehicle as a guest.

Furthermore, in some embodiments according to the invention, properties that have excess charging capacity can notify registered users or other systems of the availability of excess power, which can in-turn be marketed to registered users of other systems which may have reached capacity. Accordingly, in some embodiments according to the invention, registered users of other systems can participate in other systems which have excess capacity that may otherwise be unavailable to them at the system in which the user is registered. It will be understood that participation of the guest in a system may be included in that systems determination of the various vectors as described herein.

Figure 11:
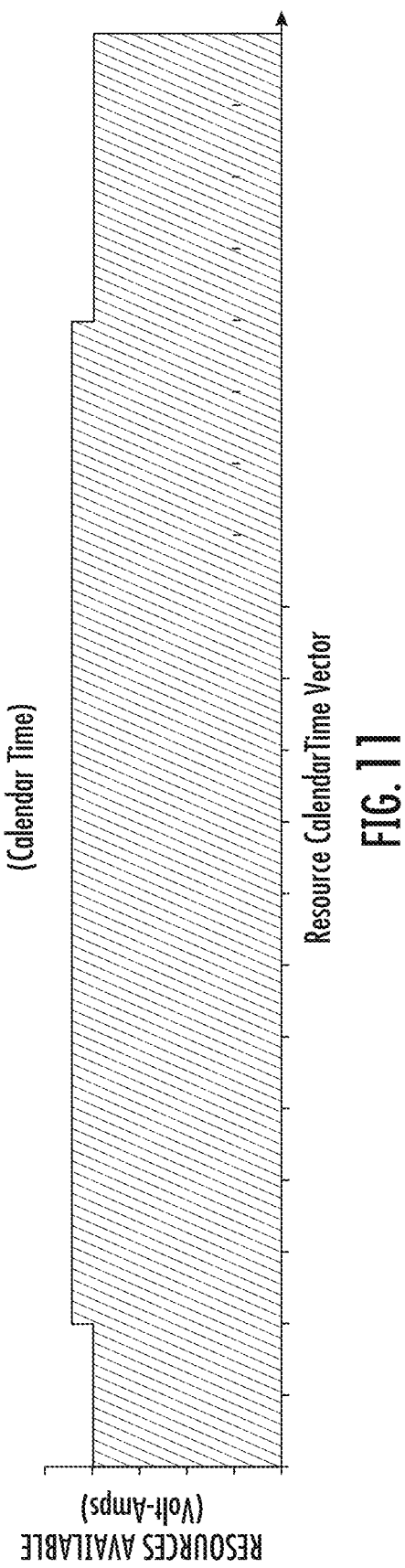
FIG. 11 is a schematic representation of a resource time vector representing the amount of electrical power in Volt-Amperes available at the property for charging electric vehicles as a function of time in some embodiments according to the invention.

FIG. 11 is a schematic representation of a resource time vector 1100 representing the amount of electrical power available for charging electric vehicles at the property as a function of time in some embodiments according to the invention. According to FIG. 11, the total amount of power available for charging at the property can vary based on other demands placed on the power supply at the property. For example, in some embodiments according to the invention, the amount of available power can vary based on the time of day, the time of year, local provisioning of power by the electrical grid operator and other factors. It will be further understood that the resource time vector can include a prediction of power availability during the charging session. In operation, the resource time vector 1100 can affect the user's demand weight time vector by, for example, requiring charging of the user's electric vehicle be paused until additional power is available or until less demands are placed on the system (such as demands by other users' having a greater willingness to accept premium pricing when power becomes more scarce). In some embodiments according to the invention, the willingness to accept premium pricing can be expressed as a percentage over a nominal price for power. For example, if the nominal price for power is X then the willingness to accept premium pricing can be expressed as a maximum of 20% greater than X. In some embodiments according to the invention, the user may be prompted dynamically to accept or reject premium pricing in response to the system determining that the demand for power that was predicted for the charging session or if the availability of power provided to the property is reduced to less than what was predicted to be available during the charging session.

Figure 13:
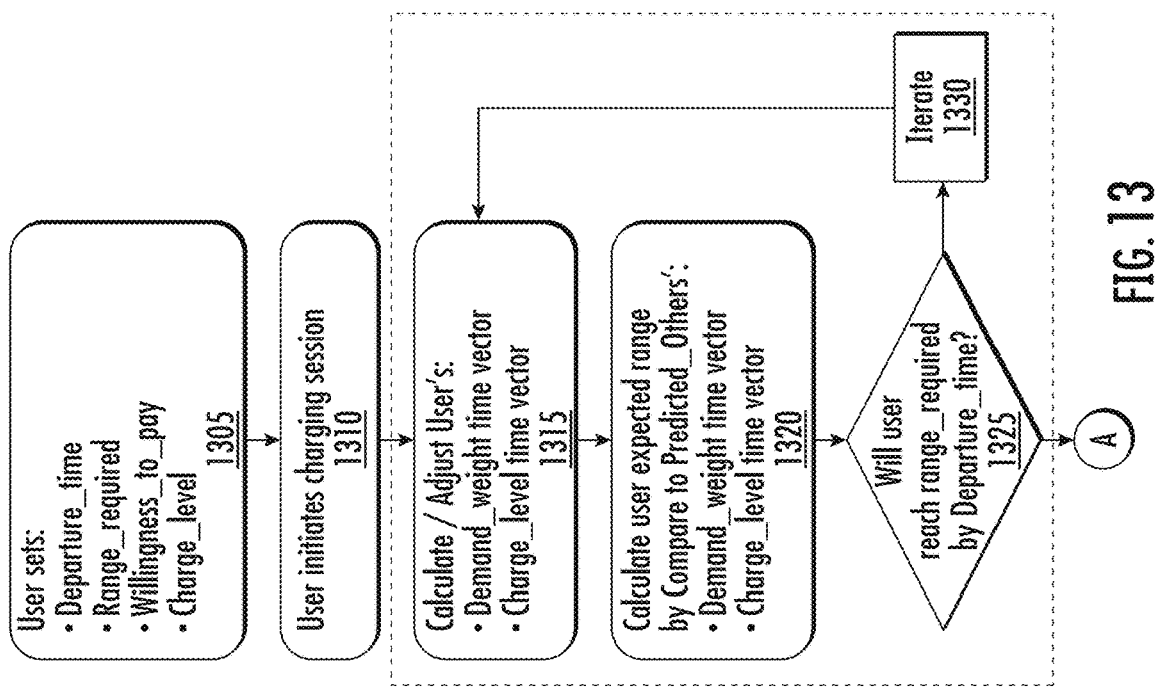
FIG. 13 is a flowchart illustrating operations including a registered user's initiation of a charging session and an iterative process of adjusting the registered user's demand weight time vector and charge level time vector 2 in view of predicted other users' demand weight time vector and charge level time vector to provide the desired travel range requested by the registered user as part of the charging session in some embodiments according to the invention.
Figure 12:
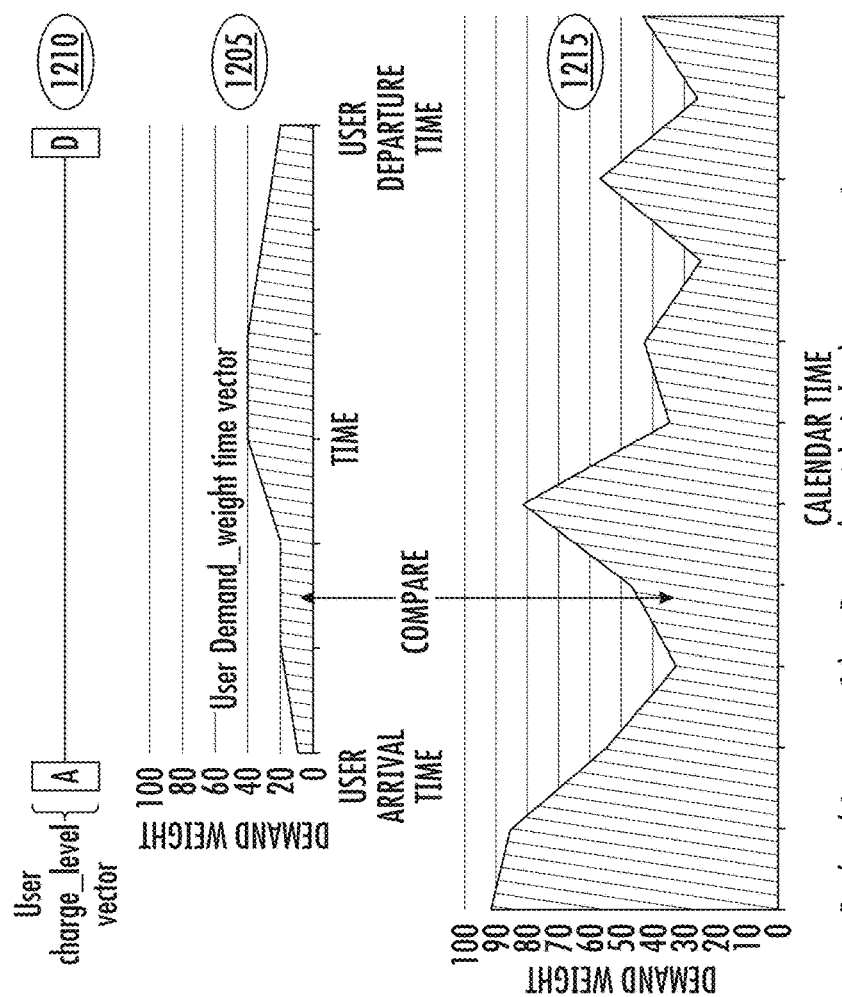
FIG. 12 is a composite representation of a registered user's demand weight vector associated with a charging session compared to the demand weight vectors for all other predicted users of the system during the charging session in some embodiments according to the invention.

FIG. 12 is a composite representation of a registered user's demand weight time vector 1205 associated with a charge level time vector 1210 as part of a charging session compared to the demand weight time vectors 1215 for all other predicted users of the system during the charging session in some embodiments according to the invention. FIG. 13 is a flowchart illustrating operations including a registered user's initiation of a charging session and an iterative process of adjusting the registered user's demand weight time vector 1205 and charge level time vector 1210 in view of predicted others user's demand weight time vector 1215 and charge level vectors to provide the desired travel range requested by the registered user as part of the charging session as described in FIG. 12 in some embodiments according to the invention.

According to FIGS. 12 and 13, when the user initiates a charging session (block 1305) the system (via a mobile application or a local terminal) prompts the user for parameters regarding how the charging session will be conducted and which will be the basis for the generation of the user demand weight time vector 1205. For example, in some embodiments according to the invention, the user can request a desired departure time, a charge level for the electric vehicle (e.g., L1 or L2), an indication of the willingness to pay a premium during the charging session, and the desired travel range to initiate the charging session (block 1310). In some embodiments according to the invention, the user's inputs from previous charging sessions can be presented as default inputs or preferences that may be modified when subsequent charging sessions are initiated, but may be modified via the user's mobile device or local terminal. Other parameters may also be provided.

In some embodiments, the system may request the level to which the user is willing to pay a premium, such as a dollar amount or a percentage over nominal pricing for charging. In some embodiments according to the invention, the system may ask whether the user should be notified before premium pricing is applied so that the user may elect to opt out of the premium pricing prior to incurring any expense. For example in some embodiments according to the invention, the system may transmit a message for approval of premium pricing in the situation where the cost time vector has changed or the others demand weight time vectors have changed during the charging session enough to modify the users demand wait time vector.

Once the charging session begins, the system can determine the user's demand weight time vector 1205 and the charge level time vector 1210 using the parameters input by the user (block 1315). The system then aggregates the user's demand weight time vector 1205 with the other's demand weight time vector 1215 including other's demand weight time vectors attributed to users who are predicted to initiate charging session at a time that is at least partially concurrent with the user's demand weight time vector 1205. In some embodiments, the other's demand weight time vectors attributed to users who are predicted to initiate a charging session are determined based on historical data and real time data associated with registered users as described herein. In some embodiments according to the invention, the other's demand weight time vectors attributed to users who are predicted to initiate a charging session are generated using a machine learning model.

The other's demand weight time vector 1215 are combined with the user's demand weight time vector 1205 to determine the travel range provided to the user by the required departure time (block 1320). If the travel range cannot be met by the departure time (block 1325) the system iterates to increase parameters of the user's demand weight time vector 1205 or to decrease parameters of the another's demand weight time vector 1215 (block 1315) and then recalculates the other's user's demand weight time vector 1205 (block 1315). Operations continue until a determination is made that the travel range provided to the user by the required departure time can be met (block (1325). Subsequently during operations the system provides charging to all users electric vehicles according to the respective user demand weight time vector.

Figure 14:
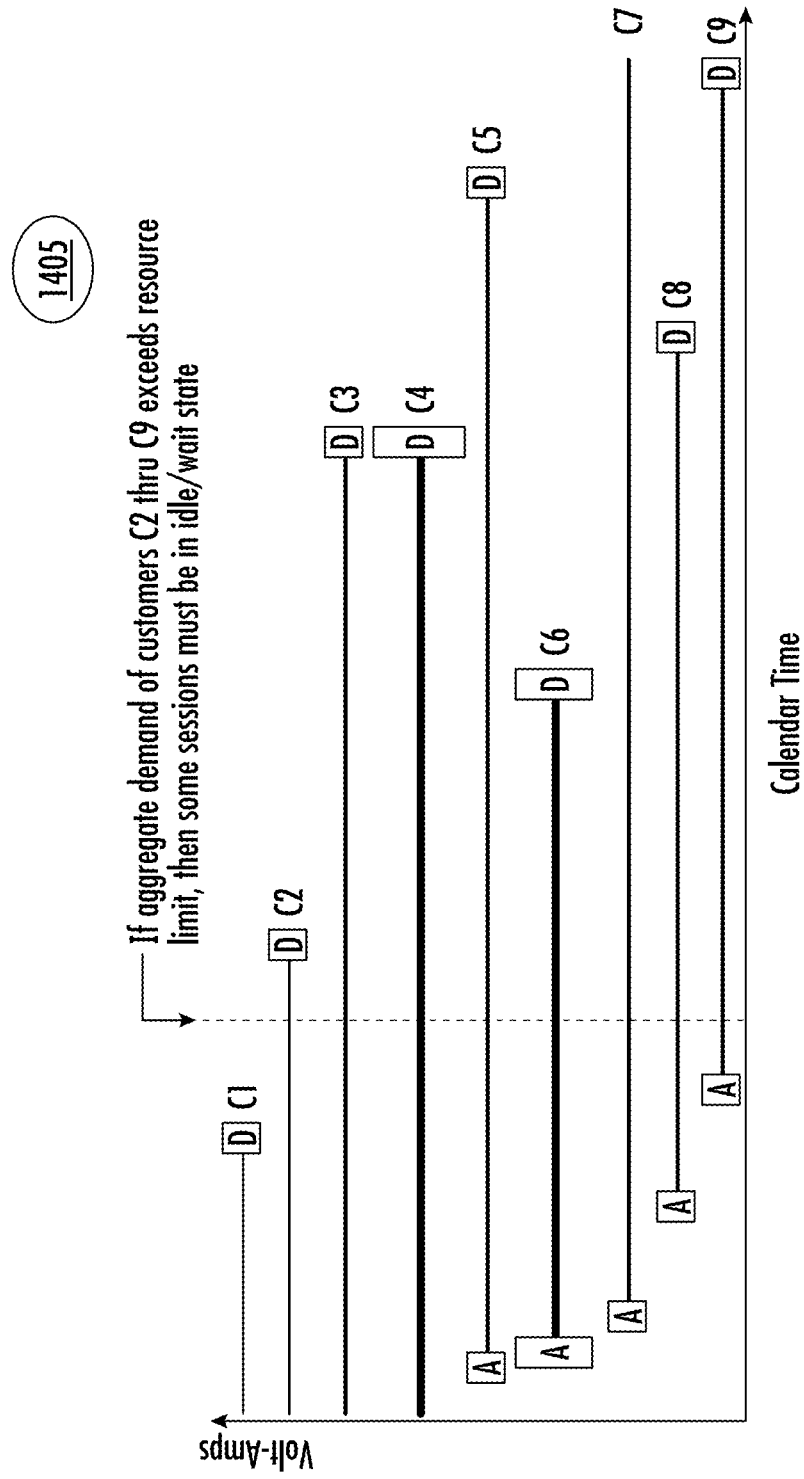
FIG. 14 is an illustration of the charge level time vectors of all users of the system aggregated (V-I) as a function of time in some embodiments according to the invention.
Figure 15:
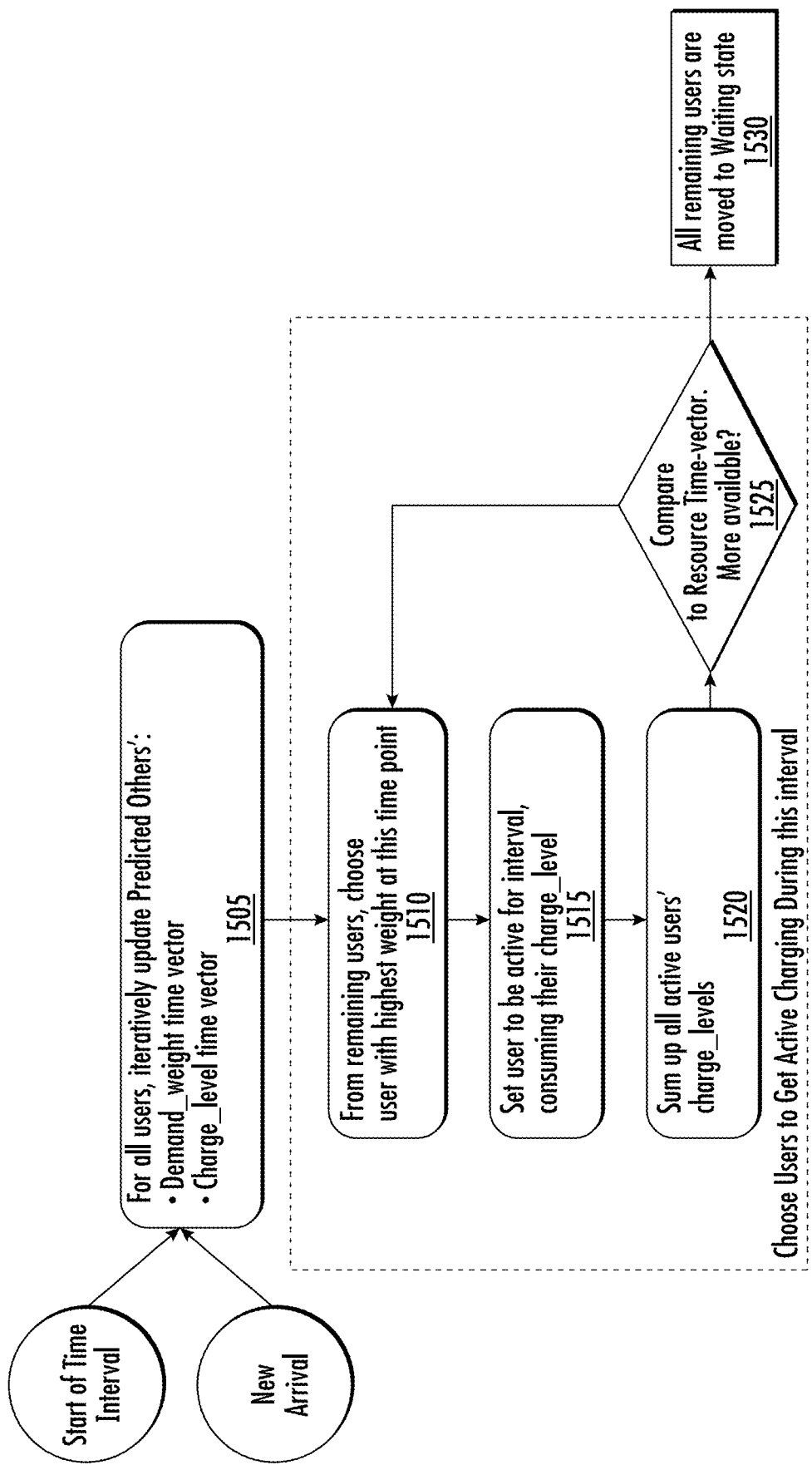
FIG. 15 Is a flowchart illustrating the Arrival of a new user of the system and the subsequent iterative allocation of charging to all users of the system for the current time interval of charging based on the weighting of each user in some embodiments according to the invention.

FIG. 14 is an illustration of the charge level time vectors of all users 1405 of the system aggregated (Volts-Amperes) as a function of time in some embodiments according to the invention. FIG. 15 is a flowchart illustrating that, upon arrival of a new user (after the initiation of charging session as shown in FIG. 13) or the start of a new interval, the system updates the demand_weight vectors. According to FIGS. 14 and 15, operations can begin upon a new user initiating a charging session (block 1505) whereupon operations described above in FIGS. 12 and 13 can be carried out to determine a user demand weight time vector and charge level vector for the requested charging session. During these operations, the preexisting users of the system (1405) and the user that are predicted to request charging (other user demand weight time vectors also shown in 1405) are used to determine the user's demand weight time vector.

Once the user's demand weight time vector is determined, when a charging time interval of the charging session begins, the system allocates the amount of power from the resource time vector to the charging session having the greatest weighting among the currently unallocated charging sessions (block 1510) which then can begin the charging session (block 1515) which is then combined with the power already allocated from the resource time vector to provide a current allocated power for the current charging interval (1520). If the allocated power for the current charging interval is less than the resource time vector for the current charging interval (block 1525) then operations continue at block 1510. If, however, the allocated power for the current charging interval is within a range of the resource time vector for the current charging interval (block 1525) then all remaining unallocated charging sessions are placed in a wait state until unallocated power is provided from the resource time vector so that lower weighted charging sessions can be removed from the waiting state.

As described herein, the processor circuits and memories described herein are examples of portions of systems upon which one or more aspects of embodiments of the present invention can be implemented. For example the processor circuits and memories utilized for the LCU can be a computing system that can be used to perform processor-executable instructions represented by non-transitory processor-readable media to carry out the operations described herein. Similarly a portion of the process may be implemented in the cloud Server 60.

Examples of processor circuit can include logic, one or more components, circuits (e.g., modules), or mechanisms. Circuits are tangible entities configured or programmed to perform certain operations. In an example, processor circuits can be arranged (e.g., internally or with respect to external entities such as other circuits) in a specified manner. In an example, one or more processor circuits can be configured by software (e.g., instructions, an application portion, or an application) as a circuit that operates to perform certain operations as described herein. In an example, the software can reside (1) on a non-transitory machine readable medium (such as a memory) or (2) in a transmission signal.

In an example, a circuit can be implemented mechanically or electronically. For example, a circuit can comprise dedicated circuitry or logic that is specifically configured to perform one or more techniques such as discussed above, such as including a special-purpose processor, a field programmable gate array (FPGA) or an application-specific integrated circuit (ASIC). In an example, a circuit can comprise programmable logic (e.g., circuitry, as encompassed within a general-purpose processor or other programmable processor) that can be temporarily configured (e.g., by software) to perform the certain operations. It will be appreciated that the decision to implement a circuit mechanically (e.g., in dedicated and permanently configured circuitry), or in temporarily configured circuitry (e.g., configured by software) can be driven by cost and time considerations.

Accordingly, the term "circuit" is understood to encompass a tangible entity, be that an entity that is physically constructed, permanently configured (e.g., hardwired), or temporarily (e.g., transitorily) configured (e.g., programmed) to operate in a specified manner or to perform specified operations. In an example, given a plurality of temporarily configured circuits, each of the circuits need not be configured or instantiated at any one instance in time. For example, where the circuits comprise a general-purpose processor configured via software, the general-purpose processor can be configured as respective different circuits at different times. Software can accordingly configure a processor circuit, for example, to constitute a particular circuit at one instance of time and to constitute a different circuit at a different instance of time.

In an example, processor circuits can provide information to, and receive information from, other circuits. In this example, the processor circuits can be regarded as being communicatively coupled to one or more other circuits. Where multiple of such circuits exist contemporaneously, communications can be achieved through signal transmission (e.g., over appropriate circuits and buses) that connect the circuits. In embodiments in which multiple circuits are configured or instantiated at different times, communications between such circuits can be achieved, for example, through the storage and retrieval of information in memory structures to which the multiple circuits have access. For example, one processor circuit can perform an operation and store the output of that operation in a memory device to which it is communicatively coupled. A further processor circuit can then, at a later time, access the memory device to retrieve and process the stored output. In an example, circuits can be configured to initiate or receive communications with input or output devices and can operate on a resource (e.g., a collection of information).

The various operations of method examples described herein can be performed, at least partially, by one or more processors that are temporarily configured (e.g., by software) or permanently configured to perform the relevant operations. Whether temporarily or permanently configured, such processors can constitute processor-implemented circuits that operate to perform one or more operations or functions. In an example, the circuits referred to herein can comprise processor-implemented circuits.

Similarly, the methods described herein can be at least partially processor-implemented. For example, at least some of the operations of a method can be performed by one or processors or processor-implemented circuits. The performance of certain of the operations can be distributed among the one or more processors, not only residing within a single machine, but deployed across a number of machines. In an example, the processor or processors can be located in a single location (e.g., within a home environment, an office environment or as a server farm), while in other examples the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., Application Program Interfaces (APIs).)

Example embodiments (e.g., apparatus, systems, or methods) can be implemented in digital electronic circuitry, in computer hardware, in firmware, in software, or in any combination thereof. Example embodiments can be implemented using a computer program product (e.g., a computer program, tangibly embodied in an information carrier or in a machine readable medium, for execution by, or to control the operation of, data processing apparatus such as a programmable processor, a computer, or multiple computers).

A computer program can be written in any form of programming language, including compiled or interpreted languages, and it can be deployed in any form, including as a stand-alone program or as a software module, subroutine, or other unit suitable for use in a computing environment. A computer program can be deployed to be executed on one computer or on multiple computers at one site or distributed across multiple sites and interconnected by a communication network.

In an example, operations can be performed by one or more programmable processor circuits executing a computer program to perform functions by operating on input data and generating output. Examples of method operations can also be performed by, and example apparatus can be implemented as, special purpose logic circuitry (e.g., a field programmable gate array (FPGA) or an application-specific integrated circuit (ASIC)).

Some of the systems described herein, can include clients and servers. A client and server are generally remote from each other and generally interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware and software architectures that can be deployed in example embodiments.

The machine readable medium described herein can include a single medium or multiple media (e.g., a local memory closely coupled to the processor circuit, a centralized or distributed database, and/or associated caches and servers) that configured to store the one or more instructions. The term "machine readable medium" can also be taken to include any tangible medium that is capable of storing, encoding, or carrying instructions for execution by the machine and that cause the machine to perform any one or more of the methodologies of the present disclosure or that is capable of storing, encoding or carrying data structures utilized by or associated with such instructions. The term "machine readable medium" can accordingly be taken to include, but not be limited to, solid-state memories, and optical and magnetic media. Specific examples of machine readable media can include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions can further be transmitted or received over a communications network using a transmission medium via the network interface device utilizing any one of a number of transfer protocols (e.g., frame relay, IP, TCP, UDP, HTTP, etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., IEEE 802.11 standards family known as Wi-Fi®, IEEE 802.16 standards family known as WiMax®), peer-to-peer (P2P) networks, among others. The term "transmission medium" shall be taken to include any intangible medium that is capable of storing, encoding or carrying instructions for execution by the machine, and includes digital or analog communications signals or other intangible medium to facilitate communication of such software.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" when used herein, specify the presence of stated features, integers, steps, operations, elements, and/or components, but do not preclude the presence or addition of one or more other features, integers, steps, operations, elements, components, and/or groups thereof. Elements described as being "to" perform functions, acts and/or operations may be configured to or other structured to do so.

Unless otherwise defined, all terms (including technical and scientific terms) used herein have the same meaning as commonly understood by one of ordinary skill in the art to which various embodiments described herein belong. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, various embodiments described herein may be embodied as a method, data processing system, and/or computer program product. Furthermore, embodiments may take the form of a computer program product on a tangible computer readable storage medium having computer program code embodied in the medium that can be executed by a computer.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wired, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages, such as a programming language for a FPGA, Verilog, System Verilog, Hardware Description language (HDL), and VHDL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Some embodiments are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

While the foregoing is directed to aspects of the present disclosure, other and further embodiments of the disclosure may be devised without departing from the basic scope thereof, and the scope thereof is determined by the claims that follow.

What is claimed:

1. A method of operating an electric vehicle charging system, the method comprising:
    receiving a first request to initiate a first charging session for a first electric vehicle associated with a first registered user of a tenant electric vehicle charging system;
    receiving a second request to initiate a second charging session concurrent with the first charging session, for a second electric vehicle associated with a second registered user of the tenant electric vehicle charging system;
    allocating a first receptacle on a first smart outlet to the first charging session to provide a first allocated receptacle;
    allocating a second receptacle on a second smart outlet to the second charging session to provide a second allocated receptacle concurrent with the first charging session;
    initiating supply of electrical power to the first electric vehicle associated with the first registered user via the first allocated receptacle responsive to the first request to initiate the first charging session, wherein the first smart outlet is configured to measure the electrical power supplied via the first allocated receptacle during the first charging session;
    initiating supply of electrical power to the second electric vehicle associated with the second registered user via the second allocated receptacle responsive to the second request to initiate the second charging session concurrent with the first charging session, wherein the second smart outlet is configured to measure the electrical power supplied via the second allocated receptacle during the second charging session;
monitoring, via the first smart outlet, the supply of electrical power to the first electric vehicle to determine a first cost associated with the first charging session;
monitoring, via the second smart outlet, the supply of electrical power to the second electric vehicle to determine a second cost associated with the second charging session;
receiving a first request to terminate the first charging session for the first electric vehicle;
receiving a second request to terminate the second charging session for the second electric vehicle;
determining a total cost for the first charging session;
determining a total cost for the second charging session;
requesting payment of the total cost for the first charging session from the first registered user; and
requesting payment of the total cost for the second charging session from the second registered user, wherein the first and second smart outlets include:
a first controllable switch coupled to electrical power and configured to selectably switch the electrical power from a first input to a first output or from the first input to a second output;
a level 2 receptacle electrically coupled to the first output; and
a first level 1 receptacle electrically coupled to the second output.

2. The method of claim 1 further comprising:
(a) interrupting the supply of electrical power to first electric vehicle and/or to the second electric vehicle responsive to detecting that an aggregate electrical power supplied to the first electric vehicle and to the second electric vehicle exceeds a total available power allocated for charging electric vehicles by the tenant electric vehicle charging system; and then
(b) re-initiating the supply of electrical power to at least one of the first electric vehicle and the second electric vehicle responsive to determining that excess electrical power is available in a sufficient amount to avoid the aggregate electrical power exceeding the total available power allocated for charging electric vehicles by the tenant electric vehicle charging system.

3. The method of claim 2 wherein the first and second charging sessions remain active while the supply of electrical power to first electric vehicle and/or to the second electric vehicle is interrupted.

4. The method of claim 2 further comprising:
iteratively performing operations (a) and (b) while the first and second charging sessions remain concurrently active.

5. The method of claim 1 further comprising:
receiving a third request to initiate a third charging session for a third electric vehicle with the tenant electric vehicle charging system, the third charging session being concurrent with the first and second charging sessions;
determining that an aggregate electrical power supplied to the first, second, and third electric vehicles will exceed a total available power allocated for charging electric vehicles by the tenant electric vehicle charging system; and setting up an intermittent interruption/re-initiation supply of electrical power to the first, second, and third electric vehicles during concurrent portions of the first, second, and third charging sessions to avoid the aggregate electrical power exceeding the total available power allocated for charging electric vehicles by the tenant electric vehicle charging system.

6. The method of claim 5 wherein the intermittent interruption/re-initiation supply of electrical power to the first, second, and third electric vehicles is scheduled according to respective priorities including a weighted demand and willingness to accept premium pricing of the first, second, and third charging sessions.

7. The method of claim 2 further comprising:
providing the supply of electrical power to the first and second electric vehicles via an electrical utility power grid or via an electrical power storage system that operates under control of the tenant electric vehicle charging system.

8. The method of claim 2 the further comprising:
initiating the supply of electrical power from an electrical utility power grid to charge an electrical power storage system responsive to detecting reduced demand for charging by the tenant electric vehicle charging system; and
initiating the supply of electrical power from an electrical power storage system that operates under control of the tenant electric vehicle charging system to increase the total available power allocated for charging electric vehicles by the tenant electric vehicle charging system.

9. The method of claim 2 further comprising:
transmitting an indication to the first registered user and/or the second registered user responsive to interruption of the supply of electrical power and re-initiation of the supply of electrical power.

10. The method of claim 6 further comprising:
transmitting an indication of the intermittent interruption/re-initiation supply of electrical power to the first registered user and/or the second registered user responsive to the interruption of the supply of electrical power and the re-initiation of the supply of electrical power.

11. The method of claim 1 further comprising:
a second controllable switch coupled to electrical power and configured to selectably switch the electrical power from a second input to a third output or to a fourth output;
a second level 1 receptacle electrically coupled to the third output; and
wherein the level 2 receptacle is electrically coupled to fourth output.

12. The method of claim 11 further comprising:
a first switch coupled in-series between the second output and the first level 1 receptacle; and
a second switch coupled in-series between the fourth output and the second level 1 receptacle.

13. A method of operating an electric vehicle charging system comprising:
receiving a request to initiate a charging session for an electric vehicle associated with a registered user of a tenant electric vehicle charging system;
allocating a receptacle of a smart outlet to the charging session to provide an allocated receptacle;
initiating supply of electrical power to the electric vehicle associated with the registered user via the allocated receptacle responsive to the request to begin the charging session, wherein the smart outlet is configured to measure the electrical power supplied via the allocated receptacle during the charging session;

monitoring, via the smart outlet, the supply of electrical power to the electric vehicle to determine a cost associated with the charging session;

receiving a request to terminate the charging session for the electric vehicle;

determining a total cost for the charging session; and requesting payment of the total cost for the charging session, wherein the smart outlet includes:

a first controllable switch coupled to electrical power and configured to selectably switch the electrical power from a first input to a first output or from the first input to a second output;

a level 2 receptacle electrically coupled to the first output; and a first level 1 receptacle electrically coupled to the second output.

14. The method of claim 1 wherein the first smart outlet is configured to detect insertion of a plug coupled to the first electric vehicle into the first receptacle.

15. The method of claim 14 wherein the first smart outlet is configured to wirelessly communicate an indication of the electrical power provided by the first allocated receptacle to a Local Control & Uplink system that is configured detect if a total electrical power requested by the electric vehicle charging system is exceeded.

16. The method of claim 14 wherein the first smart outlet is configured to detect at least one of: a flow of the electrical power via the first allocated receptacle, motion proximate to the first smart outlet, vibration of the first smart outlet, movement proximate to the first smart outlet, sound, and/or near-field/RF communications.

17. The method of claim 13 wherein the smart outlet is configured to detect insertion of a plug coupled to the electric vehicle into the receptacle.

18. The method of claim 17 wherein the smart outlet is configured to wirelessly communicate an indication of the electrical power provided by the allocated receptacle to a Local Control & Uplink system that is configured detect if a total electrical power requested by the electric vehicle charging system is exceeded.

19. The method of claim 17 wherein the smart outlet is configured to detect at least one of the following: a flow of the electrical power via the allocated receptacle, motion proximate to the smart outlet, vibration of the smart outlet, movement proximate to the smart outlet, sound proximate to the smart outlet, and/or near-field/RF communications.

* * * * *